C. A. WARRING.
DIRECTION INDICATOR.
APPLICATION FILED OCT. 29, 1919.
1,396,304.
Patented Nov. 8, 1921.
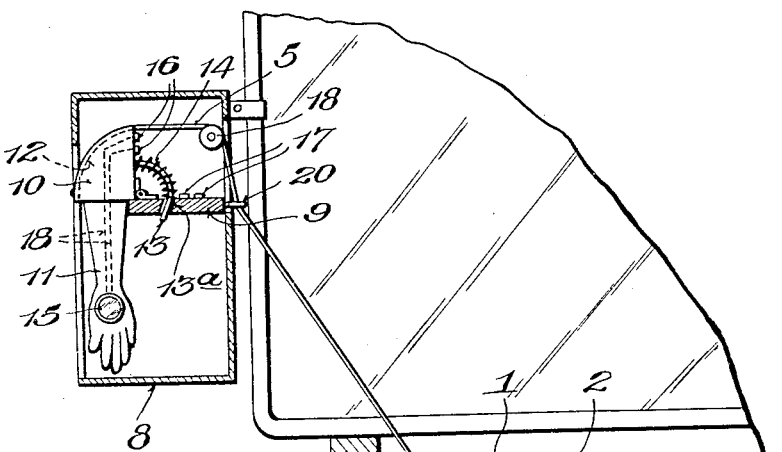
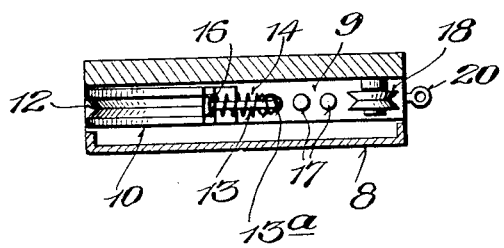
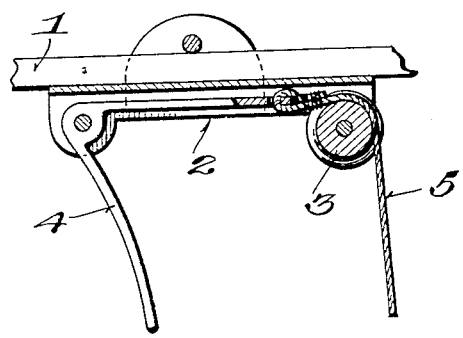
Inventor
C. A. Warring,
Witness

UNITED STATES PATENT OFFICE.

CHARLES A. WARRING, OF CLEVELAND, OHIO.

DIRECTION-INDICATOR.

1,396,304.

Specification of Letters Patent.

Patented Nov. 8, 1921.

Application filed October 29, 1919. Serial No. 334,117.

*To all whom it may concern:*

Be it known that I, CHARLES A. WARRING, a citizen of the United States, residing at Cleveland, in the county of Cuyahoga and State of Ohio, have invented certain new and useful Improvements in Direction-Indicators, of which the following is a specification.

This invention relates to a manually operated device in the form of a movable signal arm for designating the direction of a vehicle or otherwise indicating the intended movement of its operator.

The device is especially adapted for use in connection with automobiles for indicating intention on the part of the operator to turn either to the right or left.

The device hereinafter shown and described and pointed out in the claim is duplicated on opposite sides of the vehicle, but I have shown complete only the mechanism of one of them.

In the accompanying drawing:

Figure 1 is a view of the device applied partly in section.

Fig. 2 is a plan view of the arm, a casing being in section and the cable removed.

Fig. 3 is a detail view.

It will be obvious that in any device of this character many minor changes can and must be made to accommodate to various types of vehicles, and that changes in connections would be necessary on shifting the position or location of the signal device. For example a form of chain or cable connection operating the signal which would answer for a signal arm arranged adjacent the windshield would require obvious modification to connect with a device arranged at the rear of the vehicle. Furthermore it is advisable that for night use the arm be provided with an electric lamp, and in such case the wiring would depend on the source from which current was taken. If the signal device was arranged at the rear of the automobile, for example, the lamp carried by the arm could well be placed in circuit with the tail lamp of the vehicle, provision being of course made for not cutting said lamp out when the arm was inoperative, or if the signal arm was placed at the front of the automobile the signal light could be independent of the tail light circuits. It is understood therefore that electric circuits, and cable connection, *per se*, do not form a part of the invention so far as any specific form of wiring or connection is concerned.

In the drawings 1 designates the steering wheel of an automobile. Placed on the cross arm of said wheel, and on the under side of the wheel is a clip 2. There are two of these clips, arranged on opposite sides of the steering post, one to operate the signal on the right hand side and one for the signal on the left hand side. As they are duplicates only one will be described.

At the inner end, next the steering post, the clip carries a roller 3. At its outer end is pivoted a right angled bracket 4. One arm of this bracket depends and forms a thumb or finger lever. The other arm rests normally within the clip 2. To the inner end of this last mentioned arm is connected a cable, wire or cord, 5 which runs over the roller 3 and is operatively connected to the signal arm to be described hereafter.

It will be obvious that if the depending lever member of the bracket 4 be lifted against the steering wheel arm the other arm of the bracket will drop into perpendicular position, drawing the cable 5 over the roller 3.

Placed in any desired position on the automobile, either adjacent the windshield or at the rear is a casing 8, arranged vertically and open along its exposed end. The upper portion of this casing carries a horizontal shelf 9 which stops short of the open end of the casing. Adjacent the front end of the shelf, and on the top of it, is hinged a segment 10 one straight side of which carries an arm 11, while the other side, or edge is adapted to swing parallel to the upper face of the shelf. The periphery of the segment is provided with a longitudinal groove 12. The cable 5 runs over this segment and in the groove 12 being connected at the edge which carries the signal arm 11. To assist in throwing the arm, which is of light material, preferably aluminum, into downward position, viz. hidden in the casing, a curved guide bar 13 is connected to the edge of the segment opposite the signal arm and works through a suitable opening 13ª in the shelf. A coil spring 14 is seated on the shelf, encircles the guide bar, and bears against the segment. When the cable 5 is pulled on, by lifting the bracket lever on the steering wheel, the segment is rocked on its hinge and the arm drawn into horizontal position, projecting from the open end of the casing and compressing the spring 14 between the segment and the shelf. On release of the lever the spring 14 assists in returning the arm 11 to normal, invisible, position.

A lamp 15 is secured in the signal arm and conductor wires run therefrom, as at 18 to contact points 16 on the end of the segment having the guide bar. These points, when the signal arm is in horizontal position, engage contacts points 17 on the shelf. A pulley 18 is carried by the casing over which the cable 5 runs, the cable being carried downwardly through an eye 20 carried by the inner end of the shelf.

The cable 5 may be run in any desired manner from the casing 8 to the steering wheel, and over such pulleys or rollers as may be required, depending on the position of the casing. I preferably interpose in the cable a turnbuckle 21 by which any slack may be taken up. Suitable conductor wires 22 run from the contact points 17 on the shelf to any suitable source of electric energy. I do not wish to be limited to any particular form of electric wiring or to the specific manner of running the cable 5 from one portion of the vehicle to another.

What I claim is:—

In combination with the cross arm of a steering wheel, a signal operating device comprising a clip secured on the underside of the cross arm, a roller carried by the inner end of the clip, a right angled bracket pivoted to the forward end of the clip, the outer member of said bracket normally depending and the other member normally resting within the clip and parallel to the cross arm and a cable connected to the said last mentioned member and running over said pulley.

In testimony whereof I affix my signature.

CHARLES A. WARRING.